(12) United States Patent
Evison et al.

(10) Patent No.: US 6,763,383 B1
(45) Date of Patent: Jul. 13, 2004

(54) COMPUTER NETWORK INFORMATION USE MONITORING

(75) Inventors: Rufus S. T. Evison, Longstanton (GB); Paul N. Putwain, Longstaton (GB); Michael L. Woodley, Longstaton (GB)

(73) Assignee: Green Cathedral Limited (GB)

( * ) Notice: Subject to any disclaimer, the term of this patent is extended or adjusted under 35 U.S.C. 154(b) by 0 days.

(21) Appl. No.: 09/529,744

(22) PCT Filed: Aug. 27, 1999

(86) PCT No.: PCT/GB99/02843

§ 371 (c)(1),
(2), (4) Date: Jul. 12, 2000

(87) PCT Pub. No.: WO00/13373

PCT Pub. Date: Mar. 9, 2000

(30) Foreign Application Priority Data

Aug. 28, 1998 (GB) .............................................. 9818872

(51) Int. Cl.[7] ............................................ G06F 15/173
(52) U.S. Cl. ....................... 709/224; 709/223; 709/219; 709/228; 707/203
(58) Field of Search ................................ 709/224, 219, 709/217, 223, 228, 225

(56) References Cited

U.S. PATENT DOCUMENTS

| | | | |
|---|---|---|---|
| 5,732,218 A | 3/1998 | Bland et al. | 395/200.54 |
| 5,870,559 A | 2/1999 | Leshem et al. | 395/200.54 |
| 6,138,155 A * | 10/2000 | Davis et al. | 709/224 |
| 6,178,439 B1 * | 1/2001 | Feit | 709/200 |
| 6,182,133 B1 * | 1/2001 | Horvitz | 709/223 |
| 6,256,028 B1 * | 7/2001 | Sanford et al. | 345/841 |
| 6,256,620 B1 * | 7/2001 | Jawahar et al. | 707/2 |
| 6,317,782 B1 * | 11/2001 | Himmel et al. | 709/218 |

FOREIGN PATENT DOCUMENTS

| | | | |
|---|---|---|---|
| GB | 2250112 | 5/1992 | G06F/11/34 |
| WO | WO 97/22074 | 6/1997 | G06F/17/60 |
| WO | WO 97/41673 | 11/1997 | H04L/29/06 |
| WO | WO 98/10349 | 4/1998 | G06F/11/34 |
| WO | WO 98/53406 | 11/1998 | G06F/15/163 |

OTHER PUBLICATIONS

TrueCount Website, www.truecount.com, 15 pages, Aug. 26, 1998.

Dharap et al., "A Facility For Tracing Wide–Area Information Access," pp. 1–6, Computer Science Dept, The Pennsylvania State University, dated Nov. 1, 1993.

Bhargava, et al., "Relational Database Systems With Zero Information Loss," pp 76–87, IEEE Transactions On Knowledge And Data Engineering, vol. 5, No. 1, Feb. 1993.

* cited by examiner

Primary Examiner—Glenton B. Burgess
Assistant Examiner—Kevin Parton
(74) Attorney, Agent, or Firm—Gray Cary Ware & Freidenrich LLP

(57) ABSTRACT

Information sent from a server in response to a request from a client computer is accompanied by a version stamp, comprising date/time code. At the client, on each occurrence of a specified event or events, the version stamp is compared with any previous version stamp to determine whether this is a new transmission of information or not. A log is kept at the client of all information displayed, whether on-line or off-line, and the logged information is subsequently returned to the server, when a subsequent request for information is made by the client of the server. When it is determined from the version stamp that new information is being received from the server, this indicates that the logged information has reached the server, and the log can be cleared. Similar operations can be applied to the sending and receipt of e-mail messages.

18 Claims, 2 Drawing Sheets

COMPUTER NETWORK INFORMATION USE MONITORING

CROSS-REFERENCE TO RELATED APPLICATION

This application is a continuation of International Patent Application PCT/GB99/02843 dated Aug. 27, 1999, publication number WO00/13373.

BACKGROUND OF THE INVENTION

The invention relates to a method of monitoring the use of information provided over a computer network, and to computers for implementing the method.

A network is a means of communicating between two or more computers or processors, and can take many forms, including for example the internet, infra-red, radio signals and cabling. Any medium for transporting information from one computer to another can be regarded as a network.

Most of the existing technology in this field is based in the area of internet or intranet Web servers. The invention will therefore be described in the context of server logs as used in this area, but it is applicable across many other areas of client/server interaction. Another particular area of potential interest is in relation to e-mail.

Currently, when a computer which provides information (i.e. server) fills an information request, it writes to a file at the server (a server log) whatever information it has about the request. Typically this will include the following details:

(a) what time the request reached the server;
(b) what information was requested;
(c) where the information was sent to; and
(d) how the user was referred to the information (i.e. the referrer).

Some servers, or programs designed to run in conjunction with servers, will also send (e) an item of information to identify the recipient, and will record this if it is subsequently included with any future information requests. There are currently many log analysers on the market which take the details written by the server and try to form a picture of what information users have been looking at, when, and for how long.

Since servers only see the client requests, the information on timing that a server log analyser provides can be inaccurate. The time spent by the user examining the information can only be estimated by looking at the difference in time between when one request was made by a user and when the next request was made by the same user. If a user stops viewing the information sent, and later returns to it to make another information request, the time spent elsewhere may be included in the estimate for time spent viewing the sent information. This can be extremely inaccurate, to the extent of reporting hours spent viewing the requested information when only seconds were actually spent.

Another problem with timing is that over large networks such as the internet, particularly when accessed over low bandwidth connections, the time that the information takes to move from one computer to another can also become significant, and cannot be measured by server log analysis.

When copies of the information sent by the server are stored on the client computer and then viewed off-line, the server is not contacted and so no record of this viewing of the copies is kept. If either the server or the client is not connected to the network, then nothing will be seen using log analysis even if the computers are later reconnected across the network. This is another major deficiency in current methods.

With a Web server accessed by a standard browser, cached pages will often be accessed whenever the 'back button' or 'forward button' are used. No new request is sent to the server. Depending on individual settings, they may also be used for any page that is revisited on a Web site. Other different things may also cause caching, but in all cases it can lead to inaccurate timing reports being produced from server logs.

A proxy server is a server which takes a copy of information from a content server when it is first requested, and then passes it on to each client that requests it within a limited time period. Subsequent copies of any information passed through a proxy server do not involve any interaction with the content server and are therefore not recorded by the content server.

For all these reasons current methods of server log analysis are liable to be inaccurate and unreliable. We have appreciated that there is a need to provide a structure which can be used to provide more effective analysis of server usage, by overcoming at least the major ones of these problems.

The problem of proxy servers has been recognised by MatchLogic Inc., of 10333 Church Ranch Boulevard, Westminster, Colo. 80021, United States of America, which has produced a TrueCount system with a view to ameliorating the inaccuracies in counting resulting from proxy server use. In this system a small element of code is added to the header on the content pages to be counted. If the pages are cached on a proxy server, then whenever the proxy server delivers the stored content to a subsequent user, this added code element acts as a messenger and transmits a message to a special server set up to receive these messages. This however, is only a limited solution to the problems enumerated above and does not enable the other difficulties to be overcome. In particular, the system can take no account of off-line viewing, and indeed has no need to, as its intended purpose is to determine by how many users a page, or more likely an advertising banner, has been accessed. It can not give information on the length of time a page was viewed, whether on or off line, or any information of a more complex nature.

International Patent Application Publication No. WO98/10349 describes a system for monitoring the display by a user of content (e.g. advertisements) received from a server. The system is designed inter alia to make it difficult for the content provider to manipulate the log file at the server, by setting up user computers automatically to access but not display the content, and to avoid undercounting of cached pages. This is achieved by monitoring at the user computer the display of web pages, rather than just requests for pages. When a page is requested, a program is transmitted to the user which causes the user computer to determine which part of the content is being displayed on the user's screen, and to note either the number of times the content is displayed or the start and finish times of such display. This information is then transmitted back to the content provider or to another location where the monitoring information is analysed.

There are a number of problems with this system. First, it still does not disclose how to handle the viewing of pages off-line. Secondly, it is limited to the monitoring of display, which is complex and may itself be inaccurate and not properly represent the effectiveness of the content, e.g. the advertisements, being displayed. Finally, there is no effective way of both ensuring that the monitoring data reaches the location where the monitoring information is analysed and also avoiding data being stored for long and/or indefinite periods at the user computer.

Reference may also be made to International Patent Application publication No. WO97/41673.

It is well-known for web servers to send 'cookies' to user computers which are stored on the user computer and provide information about the user to the server.

SUMMARY OF THE INVENTION

The invention is defined in the independent claims below, to which reference should now be made. Advantageous features of the invention are set forth in the appendant claims.

In a preferred embodiment of the invention, described in more detail below, a provider or sender computer transmits to a requester or receiver computer code which causes the requestor computer to monitor each time a page is accessed or displayed, whether on-line or off-line, and to generate a log of such usage. The log includes events which occur not only when the requester computer is on-line to the provider computer but also events which occur off-line. When a subsequent request for information is made by the requester of the provider, the logged information is returned to or accessed by the provider computer, where it can be analysed.

The provider computer also accompanies each transmitted page with a version stamp, for example comprising date/time code. The requestor computer stores the latest received version stamp. On each occurrence of a specified event or events, it compares the version stamp in that page with the stored version stamp. If the stored version stamp is older than the version stamp of the displayed page, then it knows that the new page is being received in response to a request it has sent to the provider computer for information, and is not a stored page. Thus it knows that its logged information on usage, which will have been transmitted with that request for information, has reached the provider computer, and thus it also knows that it can clear the log, or at least it knows what information in the log is redundant.

Similar operations can be applied to the sending and receipt of e-mail messages, as described below.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENT

Figure 1:
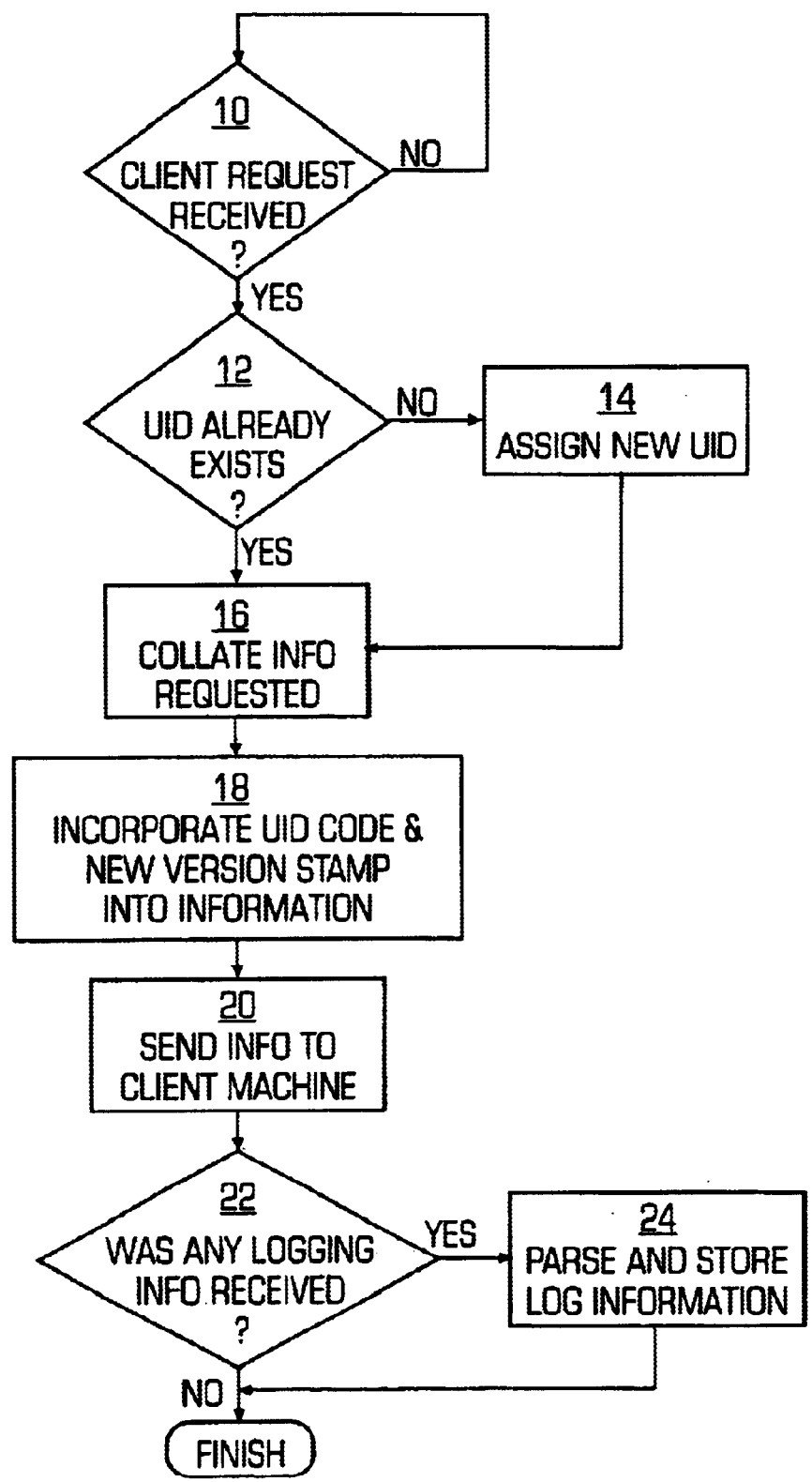
FIG. 1 is a flow chart illustrating the operation of a server in a client/server system embodying the invention.

An outline description of the preferred embodiment of the invention will first be given. The preferred embodiment takes the form of a system and method for logging the use of a server machine (computer or processor) by a client machine in a client/server relationship. It will be appreciated that this represents only one possible usage of the invention and that it is applicable to other computer networks and relationships as discussed above. In particular, the use of the invention in monitoring e-mail is described at the end of this description.

The preferred system comprises a method of logging that operates on both the server machine and the client machine. In the system, the information supplied to the client is augmented with special code which may be executed on the client machine. This additional code, when executed, records information about the behavior of the user, by reference to specified events occurring at the user computer. This may include the time the user spends accessing or looking at the information supplied. The recorded information is stored on the client in the form of a log. The information recorded is not limited to the time the user spends accessing the information supplied but can include also other information about the behavior of the user, such as how far down the page a user scrolled, or how long they held the pointer over a particular banner or button, for example.

The additional code is not only operational when the client is on-line to the server but also executes when the information is being viewed off-line.

In the augmented code is also included a version stamp, which can simply be a date/time code. This version stamp indicates the time when, relative to other transmissions of information to this client, the information was transmitted by the server. This information is copied to client-side storage. A comparison by the client computer of the version stamp which accompanies any viewed information with the copy previously stored on the client first confirms to the client what information has reached the server. In particular it enables the client to determine whether the server has been contacted in the interim, and accordingly it can also determine how the information stored on the client should be kept. This includes, for example, whether old information can be purged, whether new information is now required, and whether more or less information about each access should be stored. Examples of this could be:

(1) Purging all client side records that have been passed to the server.

(2) Deciding after a set amount of accesses that a user was a regular user and could be allowed greater access.

(3) Storing information about a user's behavior whilst viewing an information set if they have previously viewed information designed to influence that behavior.

The server can assign to each client a unique identifier (UID) which it then passes to the client along with the version stamp appropriate to the particular issue of the particular information set requested. The unique client or user UID is then stored at the client side for subsequent use by the server.

The system makes it possible to detect the viewing of old copies of the information provided, stored on the user's hard disk, and, if required, to stop them from being viewable.

It is possible to relate the amount of information stored about a set of sent information to how often it, or any other set of sent information from the same server, has been viewed.

The code at the client side can make decisions about information storage, that is to decide the appropriate record-keeping and behavior of the information set.

Figure 2:
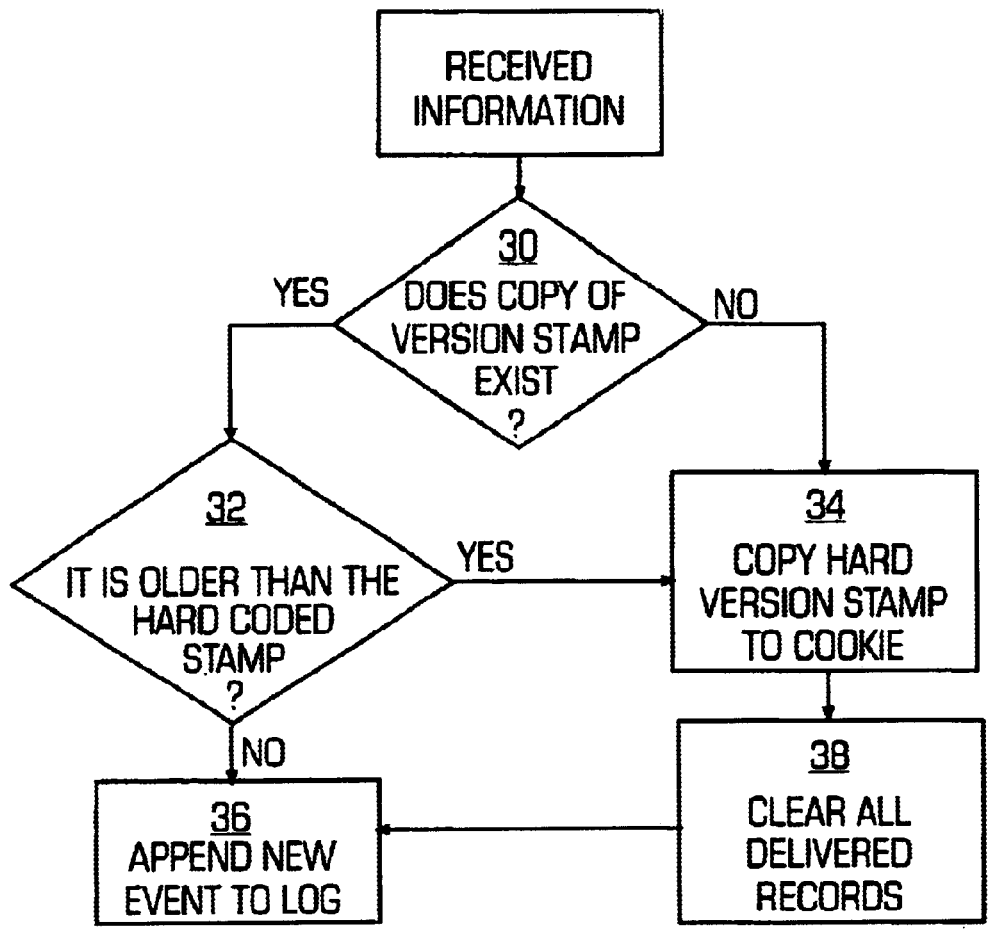
FIG. 2 is a flow chart illustrating the corresponding operation of the client.

A specific example will now be described with reference to the drawings, in which FIGS. 1 and 2 are flowcharts illustrating the execution of the method on the server and client computers respectively. The Appendix to this description contains a sample code fragment for the client side record keeping encoded in current JavaScript form.

The routine illustrated in FIG. 1 shows the steps which are taken at the server following receipt of an information request from a client, step 10. First a check is made to find out whether this client already has a unique identifier (UID), step 12, and if not, one is assigned, step 14. Then the requested information is gathered and collated, step 16. In the illustrated example no additional processing of the information takes place. However, in a more sophisticated system, additional processing could take place which was dependent upon whether a unique identifier was received, and if so, what it was.

Next, the date/time code, constituting a 'version stamp' is incorporated into the information to be sent, along with the unique identifier (UID) and the client-side code required to implement the system, step 18. As noted above, code sent in this way and stored at the recipient is commonly known in internet parlance as a 'cookie'. As described, all the code is sent with every page, but in a more sophisticated system the sending of the client-side code could be dependent upon the logging information, as just described above.

The requested information is now sent, step 20, thus achieving a reasonable response time for the client. All recording or logging at the server of information sent takes place after the sending of the information to the client, and thus does not delay the sending of the information. A check is made, step 22, as to whether the client has sent with the request any information which needs to be logged. If the client has sent logging information, this will mean that it has previously received the code and a UID before, and so the logging information is passed and stored as a record of that client's behavior.

What happens at the client will now be seen by reference to FIG. 2. The client request, which is basically conventional, and which takes place before the routine of FIG. 1, need not be shown. It may, however, include logging information as discussed below. FIG. 2 illustrates what happens at the client upon receipt of the information from the content server.

Information may come directly from the server or may have been stored or cached. When information is received at the client side by the user, the client-side code which was sent by the server first causes the client system to check, step 30, to see if a copy of the hard-coded version stamp (date/time code) exists, in a cookie received from the server. If it does not exist, the procedure moves straight to step 34 and copies the hard-coded version stamp to a cookie. If it does exist, then the procedure compares, in step 32, whether the version stamp stored at the client is the same as or alternatively is older than the currently-received version stamp. If the stored version stamp is older than the currently-received version stamp, indicating that new information has been received on-line from the server, then the procedure moves to step 34, and the new version stamp is copied to the cookie to replace the version stamp which was previously stored there. If the version stamps are the same, then the information being displayed is stored or cached information and has not just been received on-line from the content server.

After step 34, the procedure moves to step 38, where the log of information which has been sent to the server is deleted. The precise form of step 38, however, will depend on the particular implementation. In the example just described the only events being monitored are load events, so all information will have been passed back to the server, as a log cookie, when the information containing the latest version stamp was requested. Thus all log events can be deleted. As this situation will only obtain when the output of comparison step 32 is 'yes', this step 38 could in this example be moved to between steps 32 and 34. In any event, the fact that the stored version stamp is older than the version stamp of the displayed page indicates that the new page is being received in response to an information request the client has sent to the server. Thus the client knows that the logged information on usage, which will have accompanied that information request, has reached the server. This is why it knows it can clear the log. In fact, the log may not actually be cleared, as some of the information may be kept as a backup, but at least the client knows what information is now redundant.

Finally, the procedure reaches step 36, either directly from step 32, if the version stamps are the same, or via steps 34 and 38. In step 36 the current event, that is viewing the received information, is appended to the log cookie.

As described, the only event being monitored and logged is the loading of information, that is to say only when the information is displayed, and this represents the simplest embodiment of the invention. The power of the system is however such that many other different events can be monitored. Other sophistications can be introduced. For example, the appearance of the information, or how much of it is displayed, can be changed dependent upon the output of step 32.

The code illustrated in the Appendix can readily be adapted to monitor other events, e.g. the time information is being viewed, by including extra code similar to the last section of the code (from 'function GCLoaded') to monitor the additional events. The preferred solution would be to monitor every event occurring at the client computer and analyse the monitoring information by looking for specified events only. The identification of relevant events could be made at the server or they could be pre-filtered at the client. The displayed information would only then be looked at when the display is altered.

The form in which the log is kept can be chosen to suit any particular application. For example, the log can contain the page name, start time, and finish time, or the page name and viewing duration.

The log is transmitted to the server simply as a variable-length character string. As described, the log is cleared whenever a new version stamp is received. However, if desired, some or all of the records can be duplicated by storing them on both the client and server.

It will be seen from the foregoing that the server transmits with each transmission of sent information a version stamp which enables the client code to determine whether this is a new transmission of information or not. Furthermore, the client keeps a log of usage made and transmits this log to the server on the next occasion when a request for information is made of that server.

The version stamp does not have to be a date/time code, though this is a particularly convenient from for it to take. It could in principle simply be a serial number which is incremented on each transmission from the server, either to that UID or generally, or any other value which changes unidirectionally. It could be the last date/time code from the log most recently received from the client.

If proxy servers are in use, the UID received from the proxy will probably not match the UID for the client. In any event, it is as though the client and the server were not in communication, and the system operates exactly as it does when the client is viewing information off-line. However, in the present system the information transmitted from the content server to a proxy server preferably gives a zero validity time for the proxy server to hold the information. Effectively this disables the function of the proxy server. Setting the limited validity time period to zero in this way is a known technique. If this is not done, the system will still operate so long as at least occasional requests from the client get back to the content server.

The structure of internet pages is such that although each page is relatively simple, the links and interactions between them can rapidly lead to a very complex decision-making tree. Keeping track of viewing is not easy with such a structure. However, the method described of simply sending a version stamp to identify a transmission of a desired page or pages, and its use in logging the events which it is desired to monitor, and particularly in clearing the log, leads to a particularly effective way of monitoring the desired viewing and/or other events, without excessive complexity and without having to retain a log of possibly formidable size.

The specific embodiment of the invention described and illustrated is a Web session tracking program to follow a visitor to a web site, and to note their behavior patterns. The Appendix includes some sample code for keeping track of any individual web page's timing information. It does not include any attempt to compress the information, nor any error handling, both of which could advantageously be added. The code included is generic to all pages of a site, with the places where the code is unique to a specific page being omitted for clarity.

Here a typical application would be to follow a user around a Web site by looking at the time they spend on each page, both while on and off line. This is one way of measuring the effectiveness of each page. Determining the time a user spent on a given page is simple and accurate using the client side records. The server in this example tags each set of timing information with the unique identifier for that particular user, thus allowing analysis of how different pages interact.

In the Appendix, the hardcoded version stamp has a value which is set by the server. The setting of this value is not included in the code fragment.

The use of the version stamp in the manner described has the advantage that the client can be sure that the previous monitoring information has reached the server, and thus that the monitoring information stored at the client no longer needs to be retained.

Similar principles to those described can be used to monitor e-mail messages sent over the internet. This is achieved as follows. Existing e-mail programs allow the e-mail messages to be sent as HTML code, that is the code used for web pages. This option is selected at the sender computer. The message automatically carries with it the additional code necessary to undertake the monitoring at the receiving computer. The monitoring may simply confirm the receipt of the message but may include other information about the user or activities at the receiving computer. It is then necessary for the receiver to contact the sender so that the monitoring information is transmitted back to the sender. This can be achieved is one of two basic ways. In the first of these, the message includes something that causes the user to wish to contact the sender again, for example by sending a reply e-mail. Alternatively, the message may incorporate something that makes the computer contact the server independently of the user commands. This may be achieved by including a graphic towards the end of the message which has to be downloaded. The graphic may be a one-pixel picture which is in fact imperceptible to the user.

The invention has been described in the context of a specific example, and those skilled in the art will appreciate that many modifications may be made in the system described and illustrated. The system enables the monitoring of the use of information provided over a computer network and, in the form described, can monitor use not only when the provider and client machine are both connected to the network, but also when one or both of them are disconnected from the network. Also, the system is able to function in conjunction with other systems which are supplied with other information sets from the same information provider without harmful interference.

Appendix

Sample JavaScript code fragment for client side record keeping:

```
<script language="JavaScript">
<!--
   var expdate=new Date ( );
   if (GetCookie("clstr")==null){
      SetCookie ("clstr", "Entered site;");
   }
   var pname=";"+document.title+";";
      var KnownTime=new Date( );
      CheckTime( );
         var expdate=new Date ( );
         var RelativeTime=expdate.getTime(
            )-BaseTime.getTime( );
   function CheckTime( ){
      KnownTime=GetCookie('Time1');
      if (KnownTime !=BaseTime){
         SetCookie('Time1',BaseTime);
         clstrCookie=GetCookie('clstr')
         SetCookie('clstr','StartStream/');
      }
   }
   function GCLoaded (PageNumberLoad){
      expdate=new Date ( );
      RelativeTime=expdate.getTime(
         )-BaseTime.getTime( );
      SetCookie ('clstr',
      GetCookie('clstr')+PageNumberLoad+'/');
   }
//-->
</script>
```

What is claimed is:

1. A method of monitoring the use of information requested by a receiving computer from a sender computer, comprising the steps of:

transmitting information from the sender computer to the receiving computer;

transmitting with the transmitted information additional information solely for use in monitoring usage of the information, the additional information comprising a version stamp having at least a unidirectionally-varying value;

monitoring at the receiving computer the use of the received information to provide an indication of events related to information usage at the receiving computer, the monitoring step comprising comparing additional information related to received information with previously-received additional information already held at a requester computer;

recording all the monitored information at the receiving computer to provide a log;

subsequently transmitting the log from the receiving computer to the sender computer along with a subsequent request for information made by the receiving computer of the sender computer;

receiving at the sender computer the subsequent request for information along with the log;

transmitting the subsequent additional information having a later version stamp than that sent with the previously transmitted requested information;

receiving at the receiving computer the subsequent additional information and comparing the version stamp with the version stamp of the previously transmitted additional information; and if the version stamp of the subsequent additional information is later than that of the previously transmitted additional information clearing or treating as redundant the information in the log transmitted with the subsequent request.

2. A method according to claim 1, in which the additional information includes code which is operative on the receiving computer to command the receiving computer to effect the monitoring and recording steps.

3. A method according to claim 1, in which the additional information includes code which is operative on the receiving computer to command the receiving computer to effect the monitoring and recording steps.

4. A method according to claim 1, in which the monitoring step comprises monitoring the time for which pages are displayed.

5. A method according to claim 1, in which the monitoring step continues whether the receiving computer is in the communication with the sender computer or not.

6. A client computer for use in a client/server system, the client computer being adapted to provide information to the server concerning the use of information requested by the client from the server, the client computer including:

means for transmitting from the client to a server a request for specified information;

means for receiving from the server requested information corresponding to the specified information;

means for receiving from the server with the requested information additional information solely for use in monitoring usage of the requested information, the additional information comprising a version stamp having at least a unidirectionally varying value;

means for monitoring the usage of the received information, whether or not the client computer is in communication with the server, by making use of the received additional information;

means for recording all the monitored information to provide a log;

means for subsequently transmitting the log from the client computer to the server along with a subsequent request for information transmitted by the client computer to that server;

means for receiving from the server subsequent additional information comprising a version stamp in response to the subsequent request for information;

means for comparing the version stamp of the subsequent additional information with the previously received version stamp; and means for clearing or treating as redundant the information recorded in the log when the version stamp of the subsequent additional information is later than that of the previous additional information.

7. A method for monitoring the use of information requested by a requester computer from a provider computer, comprising the steps of:

receiving at the provider computer a request from the requestor computer for specified information;

transmitting from the provider computer to the requestor computer requested information corresponding to the specified information;

transmitting with the transmitted requested information additional information solely for use in monitoring usage of the requested information;

monitoring at the requestor computer/events taking place at the requestor computer including events related to the use of the received information, to provide an indication of events related to information usage at the requestor computer, the monitoring taking place whether or not the requestor computer is on-line to the provider computer;

recording all the monitored information at the requestor computer to provide a log;

subsequently transmitting the log along with a subsequent request for further specified information from the requestor computer to the provider computer;

receiving at the provider computer the subsequent request for further specified information along with the log from the requestor computer;

transmitting from the provider computer to the requestor computer further requested information corresponding to the further specified information;

transmitting with the transmitted further requested information further additional information for use in monitoring usage of the requested information; and clearing or treating as redundant the information recorded in the log at the requestor computer when the requestor computer receives and recognizes the further additional information.

8. A method according to claim 7, in which the additional information comprises a version stamp.

9. A method according to claim 7, in which the additional information includes at least a unidirectionally-varying value.

10. A method according to claim 7, in which the monitoring makes step use of the received additional information.

11. A method according to claim 7, in which the monitoring step comprises comparing additional information related to displayed received information with previously-received additional information already held at the requester computer.

12. A method according to claim 11, in which when the additional information related to displayed received information indicates that it is later than the previously-received additional information already held at the requestor computer, the information recorded in the log is cleared or treated as redundant.

13. A method according to claim 7, in which the additional information includes code which is operative on the requestor computer to command the requestor computer to effect the monitoring and recording steps.

14. A method according to claim 7, in which the monitoring step comprises monitoring the time for which pages are displayed.

15. A method according to claim 7, in which the monitoring step continues whether the requestor computer is in communication with the provider computer or not.

16. A computer program product directly loadable into the internal memory of a digital computer, the program comprising software code portions for performing the steps of claim 1 when the product is run on a computer.

17. A computer program product directly loadable into the internal memory of a digital computer, the program comprising software code portions for causing a computer to become a client computer in accordance with claim 6 when the product is run on a computer.

18. A computer program product directly loadable into the internal memory of a digital computer, the program comprising software code portions for performing the steps of claim 7 when the product is run on a computer.

* * * * *